Sept. 20, 1971  R. B. STEWARD  3,605,551
METHOD OF SUB-ZERO COOLING WHILE MACHINING SPACE-AGE MATERIALS
Filed Nov. 18, 1968
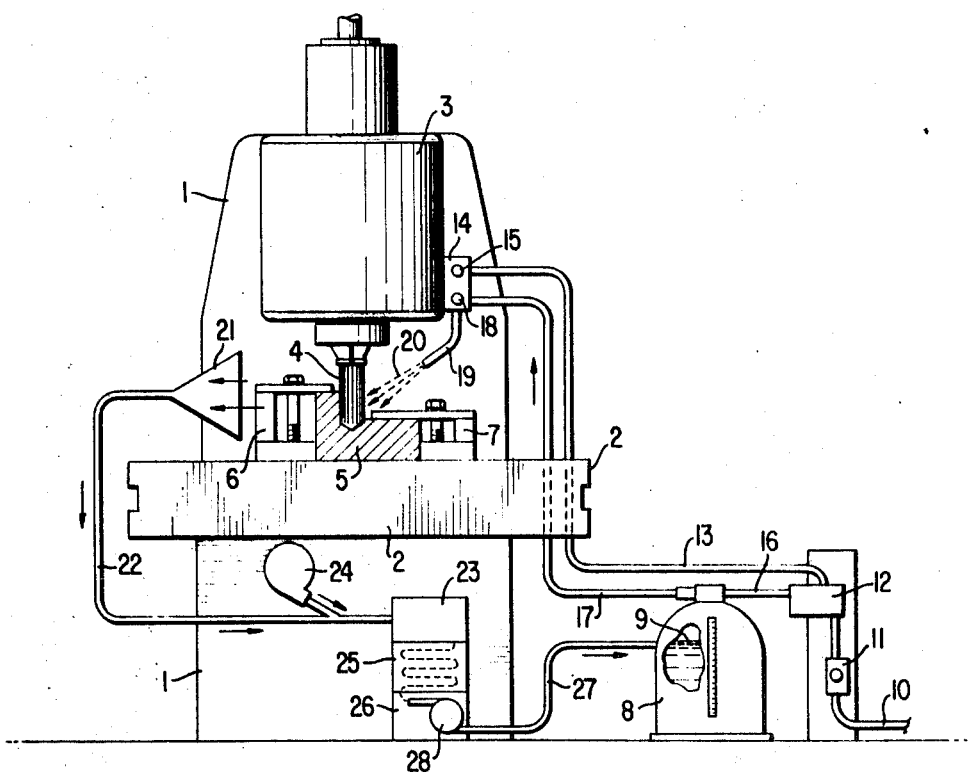
INVENTOR
Richard B. Steward
BY Alexander M. Dowell
ATTORNEYS

United States Patent Office 3,605,551
Patented Sept. 20, 1971

3,605,551
METHOD OF SUB-ZERO COOLING WHILE MACHINING SPACE-AGE MATERIALS
Richard B. Steward, 838 W. Mitchell St.,
Arlington, Tex. 76010
Filed Nov. 18, 1968, Ser. No. 776,700
Int. Cl. B23c 1/00; B23b 3/00; F01m 1/00
U.S. Cl. 90—11      3 Claims

ABSTRACT OF THE DISCLOSURE

Sub-zero cooling while machine tooling work pieces formed of space-age metals and materials, including the steps of vaporizing by air pressure a mixture of a super evaporative coolant and cutting solution in a storage tank; conveying said vaporized mixture by air pressure and discharge same as a mist through a nozzle disposed adjacent the confluence of the machine tool and the work piece to sub-zero cool the machine tool and work piece by the rapid continuous evaporation of the super evaporative coolant; recovering at least a portion of the coolant for reuse beyond the confluence of the machine tool and work piece, and then filtering and condensing the recovered coolant and redirecting the condensed coolant back into the storage tank for reuse.

DESCRIPTION OF INVENTION

This invention relates to methods of sub-zero cooling while machining space-age metals and materials such as titanium, cobalt, tungsten, tantalum, stainless steel and the Hastelloy-Inconel high-nickel super alloys which are extremely difficult to machine by conventional methods. Problems encountered are, work-hardening during light cuts, short tool life, slow machining speeds and subsequent high fabrication costs.

All of the above space-age materials exhibit high physical properties coupled with very high thermal resistance. Heavy duty machine tools with adequate horsepower and rigid setups are mandatory to offset the higher cutting pressures generated. Extremely high temperatures are generated at the confluence of the cutting tool and the work piece. Coolants presently available commercially are inadequate to successfully cope with these materials.

Basically, this invention is a method wherein various amounts of an evaporative coolant such as alcohol, carbon tetrachloride, trichloroethylene, or trichlorotrifluoroethane are added to commercially available cutting solutions. Said mixture is then applied under air pressure as a super coolant vapor mist through a nozzle or series of nozzles to the point of confluence of the cutting tool and work piece. The effect due to the rapid and continuous evaporation of the super evaporative coolant is the sub-zero cooling of the tool and work piece, thereby greatly reducing tool wear and work hardening of the work piece. Coupled with the proper grade and geometry of cutting tool outstanding results can be obtained. Doubling of feeds and speeds is not unusual. While applicable to the machining of all substances, notable cost savings are realized in the machining of the exotic space-age materials.

Heretofore, flooding of the work piece with evaporative coolants such as carbon-tetrachloride, trichloroethylene and alcohol has been used, and such flooding has shown some manufacturing improvements; however, such coolants are toxic to machine tool operators, and some are fire hazards.

I have found by recent experiments that by using a non-toxic, non-flammable liquid evaporative (trichlorotrifluoroethane) when mixed with a cutting solution and applied to the confluence of the cutting tool and the work piece as an "air boosted mist," provides a major breakthrough in the machining of these space-age materials.

Trichlorotrifluoroethane is an excellent solvent. Cutting solutions of many types, mineral or synthetic, readily combine with trichlorofluoroethane as a homogeneous mixture further enhancing trichlorotrifluoroethan's cooling properties by providing a chip-sliding lubricant as well as an advanced coolant. The use of this super coolant mist greatly extends tool life and eliminates costly tool changing and re-orientation when using tracer controlled or N/C machines. A major factor of cost is thereby eliminated. Greater accuracy is also obtained by the lessening of tool wear during contouring or long-time duration cuts.

Usage of trichlorotrifluoroethane super coolant mist is not limited to single point cutting tool operations. Outstanding results are also obtained when drilling, milling, reaming and tapping. Also as trichlorotrifluoroethane super coolant mist is non-toxic, adequate ventilation is the only safety requirement for its usage.

Useful side effects provided by trichlorofluoroethane super coolant mists can be utilized to further enhance its major advantages. Machines without such liquid coolant facilities can be inexpensively equipped for mist cooling thereby increasing their productiveness. Machine operators and manufacturing engineers now can visually observe chip action, uninhibited by liquid cutting fluids obstructing their view and can detect and correct minor cutting tool problems. Less residue remains on the work piece and post machining cleaning operations are minimized. The mechanism for providing the super coolant mist is simple, functional, and requires very little maintenance. The actual unit consists of a liquid container with a mixing valve equipped to control and vaporize the liquid and an appropriate flexible tube to direct and discharge the evaporative mist to the cutting tool and work piece. A sump type or pressurized container with appropriate adjustable mixing valves are equally effective, both utilizing air pressure readily available in all manufacturing facilities.

Trichlorotrifluoroethane is rather expensive. However, the results obtained, the time saved, and the savings in cutting tools more than offset the cost of the coolant.

Drilling and milling of space-age materials can be accomplished with ordinary high speed steel tools. However, they exhibit very short tool life. For drilling; high cobalt (8%) high speed steel, such as T-5, T-15, or M-36 grades coupled with the super coolant lubricated mist provide optimum results. For rough milling, the malcus serrated special end mills are excellent. For finish milling, the high cobalt milling cutters are the preferred choice. During both roughing and finish milling the super coolant mist will greatly improve tool life and will allow increase in feeds and speeds not otherwise obtainable.

Usage of the foregoing trichlorotrifluoroethane, super coolant mist has been on small quantity production experimental programs. Therefore, only limited experience in its usage has been explored. The trichlorotrifluoroethane grade I am using currently is very high purity and therefore expensive and therefore I provide for reclaiming the trichlorotrifluoroethane used by re-distillation. This involves a vacuum cleaner system applied to each machine and piped to a central filter and distillation device. Approximately 60 percent can be redistilled from the vapor form to the liquid. If a less pure grade would still provide a high evaporation rate and retain its non-toxic properties, it would be cheaper.

The principal objects of my invention therefore are to provide a method of sub-zero cooling while machining space age metals and materials, using trichlorotrifluoroethane super coolant mist applied to the cutting tool and workpiece, which presents the following advantages over methods heretofore used:

(1) Reduced work hardening of materials. (2) Increased tool life. (3) More material removed through increased possible depth of cut, feed and speed. (4) Greater machine operator visibility of cutting action by elimination of flooding contact area with liquid coolants. (5) Less residue remaining on workpiece, thereby reducing subsequent cleaning operations. (6) Fewer machine idling times for changing worn cutting tools. Especially valuable in numerically controlled machines where the replacement cutting tool has to be reoriented. (7) In general, reduced machining costs. (8) Machines without liquid coolant facilities can be inexpensively equipped for super coolant mist, thereby increasing their productiveness.

I will explain the invention with reference to the accompanying drawing which shows one practical embodiment thereof to enable others familiar with the art to adopt and use the same; and will summarize in the claims the essential features of the invention, for which protection is desired.

The drawing shows an elevation, partly in section, of a typical milling, drilling, tapping or cutting machine in which my super coolant from a coolant container is applied as a spray or mist to the cutting tool thereof, and in which a portion at least of the super coolant after use is recovered and returned to the coolant container.

As shown in the drawing, the milling, drilling, tapping or cutting machine 1 has a work table 2 and a motor 3 disposed over the table 2 which rotatably supports the milling, drilling, tapping or cutting tool 4 which operates upon the workpiece 5 which is supported upon the table 2 below the tool 4 and maintained in position on the table 2 between workpiece holders 6 and 7. The particular form of the machine 1 and the workpiece holders 6 and 7 form no part of my present invention.

The super coolant is supplied and discharged as a mist adjacent the tool 4 while cutting, the coolant being stored in a pressurized evaporative coolant container 8 disposed adjacent the machine 1, which container holds the proper mix 9 of evaporative coolant and cutting solution, as indicated in the drawing.

Air from a shop air compressor or the like is supplied through pipe 10 having a pressure regulator 11, the air entering a regulator 12 from which the air passes through branch 13 to an atomizing valve 14 having an air metering valve 15 associated therewith. A second branch 16 from the regulator 12 pressurizes the evaporated coolant container 8 whereby the proper mix 9 of evaporative coolant and cutting solution is delivered from container 8 through line 17 leading to the atomizing valve 14, the line 17 being controlled at the valve 14 by a coolant metering valve 18. Upon proper regulation of the metering valves 15 and 18 the pressurized sub-zero super coolant mist is delivered from the atomizing valve 14 through discharge tube 19, the same being emitted from the tip of pipe 19 as a spray or mist 20 directed against the tool 4. The discharge tube 19 may have orifices therein of various sizes according to the size of the cutting tool 4, depth of cut, feed and speed of the tool 4.

Associated with the machine 1 is a coolant recovery system by which a portion at least of the coolant 9 may be recovered and reused to hold expenses down to a minimum. In brief, the vacuum recovery system consists of a funnel or hood 21 on the opposite side of the tool 4 from the spray or mist 20 into which a portion at least of the spray or mist enters as indicated in the drawing, the spray collected in the hood 21 passing downwardly through pipe 22 into a filter 23 assisted by a blower 24 which forces the coolant in pipe 22 into the filter 23. The filtered coolant then drops into a condenser 25 from which the same drops into a coolant receiving tank 26 from which the coolant is passed through a pipe 27 assisted by a pump 28 back into the container 8 for reuse. Such vacuum system thus changes the recovered gaseous coolant back to liquid form, and directs such liquid by means of pump 28 back into the coolant tank 8, the vacuum being supplied by the blower 24.

Since the application of this invention permits more material removal than heretofore, the exact geometry of the shape of the cutting tool must be changed, generally to a sharper cutting angle. In some instances a nearly negative rake angle is used. This causes much better surface finishes and does not diminish tool "life."

The mix of cutting solution and trichlorotrifluoroethane is varied according to the type of material being worked and generally is between 2 and 12 ounces of cutting solution per gallon of trichlorotrifluoroethane.

In comparing my method as against conventional methods, and in order to establish improved machining performance and subsequent cost savings by use of my method, it is necessary to consider many variables; specifically: material types, heat treated or annealed material condition; shape of part; type of metal removal, such as, single point turning, drilling, or milling using multitoothed cutters; type of machine tool being utilized and its size and condition; the geometry of the specific cutting tool being employed and the material type of the cutting tool being deployed.

The application may be to Titanium Alloy 6 Ae 4 v., annealed condition, in which the part to undergo metal removal has been press-formed into a hollow hemishell having an inside radius of 8.000 inches and a wall thickness of .5 inch. This rough pressed part is to be finish machined to 8.125±.002 inside radius and the outside surface machined to produce a finished wall thickness of .250±.002 inch, utilizing an optimum geometry single point turning tool made from an optimum grade of tungsten carbide, and the operations are performed on a precision tracer lathe in excellent condition. Remaining variables being, the coolant or lubricant chosen to eliminate or reduce heat and abrasion from both the work piece and the cutting tool, the "speed" of rotation of the work piece; the depth the tool is forced into the work piece "depth of cut"; and the rate of travel the tool is moving along the contour of the work piece per part revolution ("feed").

Both water base emulsions and oil base liquids of all known types have experimentally been applied as a stream coolant/lubricant and a water base emulsion has proven to provide optimum tool life and the shortest time cycle using the following machine setting parameters, is Speed of rotation in r.p.m.=25
Depth of cut in inches (roughing)=.030
Depth of cut in inches (finishing)=.007
Feed rate roughing=.010
Feed rate finishing=.005

Using all of these conventional parameters, the total time elapsed to finish machine, part is calculated to be 8 hours, in other words, an optimum operation, using the best known methods that the state of the art can presently provide.

Now, to examine the same process, leaving all parameters identical, except this time utilizing the method with super coolant/mist.

If speed, feed, and depth and cut are not altered, tool life will be dramatically increased to approximately 20 times normal. However, if I now double the speed and feed rates and adjust the depth of cut as follows:

Speed to rotation in r.p.m.=50
Depth of cut in inches (roughing)=.040
Depth of cut in inches (finishing)=.010
Feed rate roughing=.020
Feed rate finishing=.005 no adverse effects will materialize. The chips and part will remain noticeably cooler and tool life will be at least doubled while reducing machining time from 8 hours to 3½ hours. Further, the cutting tool geometry can be slightly altered by increasing the back rake angle 3° to 15° providing a smoother surface texture on the work piece.

Drilling, tapping, milling and other multipoint chip removing tooling applications are dramatically enhanced by my method. Cool clean cuts and greatly extended tool life are the rule rather than the exception.

Example: Material, Inconel X, a very tough high nickel alloy;

Problem: Drill (50) .500 dia. holes to a depth of 2.000 inches;

Tool used: .500 dia. taper shank 35° crankshaft drill of 8% cobalt high speed steel;

Conventional method: Flood drill and work piece with Suphur base cutting

Oil cooled to 40° F.
Speed=100 r.p.m.
Feed=.004 per rev.

Performance conventional method:

Any hole could not be drilled with a single drill. Drills would become dull and work-harden the work piece. Some holes required three drills which become dulled to complete one finished hole.

Performance utilizing my method:

Allowing the coolant nozzle to dwell on the material in the area to be drilled for 10 to 15 seconds and then immediately drilling, with the nozzle pointing to the confluence of the drill and the work piece, produced as many as 60 holes with the same drill. An average of 15 holes per drill became common practice utilizing same speed and feed as conventional process.

Time required, per hole, Conventional Process=40 minutes including tool change time;

Time required, per hole, utilizing my method=6 minutes including tool change time.

Having described my invention, I now make the following claims:

1. The method of sub-zero cooling while machine tooling work pieces formed of space-age metals and materials, comprising the steps of vaporizing by air pressure a mixture of a super evaporative coolant and cutting solution in a storage tank; conveying said vaporized mixture by air pressure and discharging same as a vapor mist through a nozzle disposed adjacent the confluence of the machine tool and the work piece to sub-zero cool the machine tool and work piece by the rapid continuous evaporation of the super evaporative coolant; recovering at least a portion of the coolant mist beyond the confluence of the machine tool and work piece, and then filtering and condensing the recovered coolant and redirecting the condensed coolant back into the storage tank for reuse.

2. In a method as set forth in claim 1, said coolant being trichlorotrifluoroethane.

3. In a method as set forth in claim 1, using a typical tool in which an increased back rake angle is used.

References Cited

UNITED STATES PATENTS

| | | | |
|---|---|---|---|
| 2,664,173 | 12/1953 | Karig | 184—104X |
| 2,789,922 | 4/1957 | Allen | 184—6Z |
| 3,104,826 | 9/1963 | Morris | 77—55.3X |

OTHER REFERENCES

Machinery, vol. 97, Aug. 17, 1960, entitled "The Machining of Ultra-High-Tensile Steels With $CO_2$ as a Coolant," pp. 360–371.

GIL WEIDENFELD, Primary Examiner

U.S. Cl. X.R.

82—1; 83—171; 184—6; 29—106